United States Patent [19]

Langen

[11] Patent Number: 4,862,846
[45] Date of Patent: Sep. 5, 1989

[54] COOLING WATER HEATER FOR INTERNAL COMBUSTION ENGINES

[75] Inventor: Herbert Langen, Altbach, Fed. Rep. of Germany

[73] Assignee: J. Eberspaecher, Fed. Rep. of Germany

[21] Appl. No.: 171,655

[22] Filed: Mar. 22, 1988

[30] Foreign Application Priority Data

Mar. 23, 1987 [DE] Fed. Rep. of Germany ....... 3709444

[51] Int. Cl.$^4$ ............................................. F02N 17/02
[52] U.S. Cl. ............................................. 123/142.5 R
[58] Field of Search .................. 123/142.5 R, 142.5 E; 60/320

[56] References Cited

U.S. PATENT DOCUMENTS

| 975,651 | 11/1910 | Stern | 123/142.5 R |
|---|---|---|---|
| 2,695,603 | 11/1954 | Williams | 123/142.5 R |
| 2,731,959 | 1/1956 | Kratzer | 123/142.5 R |
| 3,093,126 | 6/1963 | Baker | 123/142.5 R |
| 3,194,944 | 7/1965 | Papp | 123/142.5 E |
| 3,236,220 | 2/1966 | Holmes | 123/142.5 R |
| 3,277,886 | 10/1966 | Ryals et al. | 123/142.5 R |
| 4,423,307 | 12/1983 | Kondo et al. | 123/142.5 E |
| 4,706,644 | 11/1987 | Nakai | 123/142.5 R |

FOREIGN PATENT DOCUMENTS

| 5414 | 1/1980 | Japan | 123/142.5 E |
|---|---|---|---|
| 18406 | 1/1982 | Japan | 123/142.5 R |
| 178319 | 9/1935 | Switzerland | 123/142.5 E |

Primary Examiner—Noah P. Kamen
Attorney, Agent, or Firm—McGlew & Tuttle

[57] ABSTRACT

Arrangement for supplying heat to the cooling fluid of a combustion engine, with a heating apparatus, which has a combustion chamber for gaseous or for liquid fuel, and with a heat exchange device, with which heat generated by the heating apparatus can be transferred to the cooling fluid. The heating apparatus is connected on the outside of the engine block of the combustion engine in such a way, that the heat transfer from the hot combustion gases from the combustion chamber to the cooling water or fluid takes place through the outer wall of the engine block.

11 Claims, 2 Drawing Sheets

COOLING WATER HEATER FOR INTERNAL COMBUSTION ENGINES

BACKGROUND OF THE INVENTION

Field of the Invention

This invention relates, in general, to internal combustion engine preheating devices and, in particular, to a new and useful device for heating the fluid which is circulated through an internal engine jacket.

The invention relates to an arrangement for introducing heat to the cooling water of a combustion engine, with a heating apparatus, which has a combustion chamber for gaseous or for liquid fuel, and with a heat exchange device, with which the heat generated by the heating apparatus can be transferred to the cooling water.

Engine-independent heating apparatus, with which the cooling water of combustion engines can be heated, are known. These heating apparatus were, until now, installed in places that were appropriate from the point of view of space requirement at a distance from the combustion engine in the engine compartment of a motor vehicle. They contain a combustion gas/water heat exchanger and are inserted in a suitable manner into the cooling water circulation of the combustion engine. These heating apparatus are constructionally rather elaborate.

Technical progress leads to combustion engines with ever-increasing degree of effectiveness, with the consequence that the dissipation heat of the combustion engine available for heating the motor vehicles becomes increasingly less. Further, in particular, in the case of motor vehicles primarily used for city driving or for short distance driving, a tendency to use smaller combustion engines can be observed, which, in particular, in cold weather or in stop-and-go traffic supply an insufficient amount of heat to heat the interior of motor vehicles comfortably. These points and increased demands by drivers, in particular with respect to reliable cold starts, rapidly clearing windows, and comfortable interior temperatures led to wide distribution of the demand for engine-independent heaters.

SUMMARY OF THE INVENTION

The invention is based on the task of making available a less elaborate arrangement and, consequently, an arrangement which can be manufactured more cost-effectively.

The arrangement according to the invention provides a heater which is connected to the engine block of the combustion engine in such a way that the heat transfer from the combustion gases of the combustion chamber to the cooling water takes place through the outer wall of the engine block.

Instead of carrying the heat exchange combustion gases/cooling water outside the combustion engine in a heat exchange device assigned to the heater, the invention includes the engine block itself in the heat transfer from the combustion gases to the cooling water with a concomitant decrease of the manufacturing costs for an arrangement. Fuels to consider are, in particular, Diesel oil and gasoline, but also diverse kinds of gases such as the liquid gas or propane gas used for operating motor vehicle combustion engines. It should be pointed out that the arrangement according to the invention is not only usable for driving combustion engines of motor vehicles, but also for boat motors, driving motors of current generating units, driving motors of pumps, etc., generally wherever combustion engines are used. The arrangement according to the invention can serve, on the one hand, to prewarm a combustion engine before starting the engine at low outside temperatures, with the additional effect resulting that after starting the heating effect of the normal vehicle heating system starts considerably sooner. On the other hand, use as support of the normal vehicle heating system is possible, in particular during extreme cold or stop-and-go traffic.

Preferred models of the invention are indicated in the secondary claims. Partially in conjunction with an embodiment and partially immediately following below, explanations supplementing the model features will be discussed.

In the interest of effective heating of the cooling water it is preferred that the area of the engine block used for heat transfer according to the invention not be too small. For this purpose, it is in many cases, advisable to create a transition from the relatively small flow cross section of the gases in the combustion chamber to a relatively greater area for the heat to act upon the outer wall of the engine block. It is understood, that the layout be arranged expediently so that the engine block in the appropriate area is acted upon by heat from the outside, which, while it ensures effective heating of the cooling water and avoids local overheating at the same time. The fuel/air ratio of the combustion in the combustion chamber, the distance of the combustion zone in the combustion chamber to the outer wall of the engine block, the spatial distribution of the combustion gas stream should be selected so as to be suitable for this purpose.

The simplest solution from the point of view of constructional expenditures is in connecting the open front face of the heating apparatus immediately to the engine block respectively fastening it on it so that the hot combustion gases stream act directly along the outside of the engine block in a given area. It is, however, also possible to form the heating apparatus with a metal closing plate on its front face which, in turn, is fastened on the engine block, so that the combustion gases do not strike the engine block directly, but the heat transfer takes place through the closing plate and from there through the outer wall of the engine block.

If the cooling water of the combustion engine is warmed in a given area through the outer wall of the engine block, then due to the thermosiphon effect cycling of the cooling water commences even without operation of the customary cooling water pump belonging to the engine. To support this cycling motion of the cooling water, an electrically driven additional cooling water circulation pump can be provided, which is switched on when the engine cooling water pump does not run.

A particularly suitable place for connecting or fastening the heating apparatus is the outside of the cylinder block. The cooling water rotation carries the heat introduced from the outside practically to the entire engine. The heat reaches the oil pan of the engine primarily by conduction of the heat through the metal.

Accordingly, it is an object of the invention to provide an improved cooling fluid heater for internal combustion engines which have an engine jacket with a wall through which the cooling fluid is circulated and which comprises a liquid fuel heater which operates from its own fuel source and which has a heater housing which defines a combustion chamber and also a transition piece chamber which is connected to the combustion chamber and which is adapted to encircle or cover a portion of the engine and wherein the heater has its own fuel and air supply for generating gaseous products of combustion which are directed through the transition piece against the jacket of the engine to heat the fluid that is being circulated.

A further object of the invention is to provide a device for heating or preheating an engine and the cooling fluid therefor which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

DESCRIPTION OF THE PREFERRED EMBODIMENTS

Figure 1:
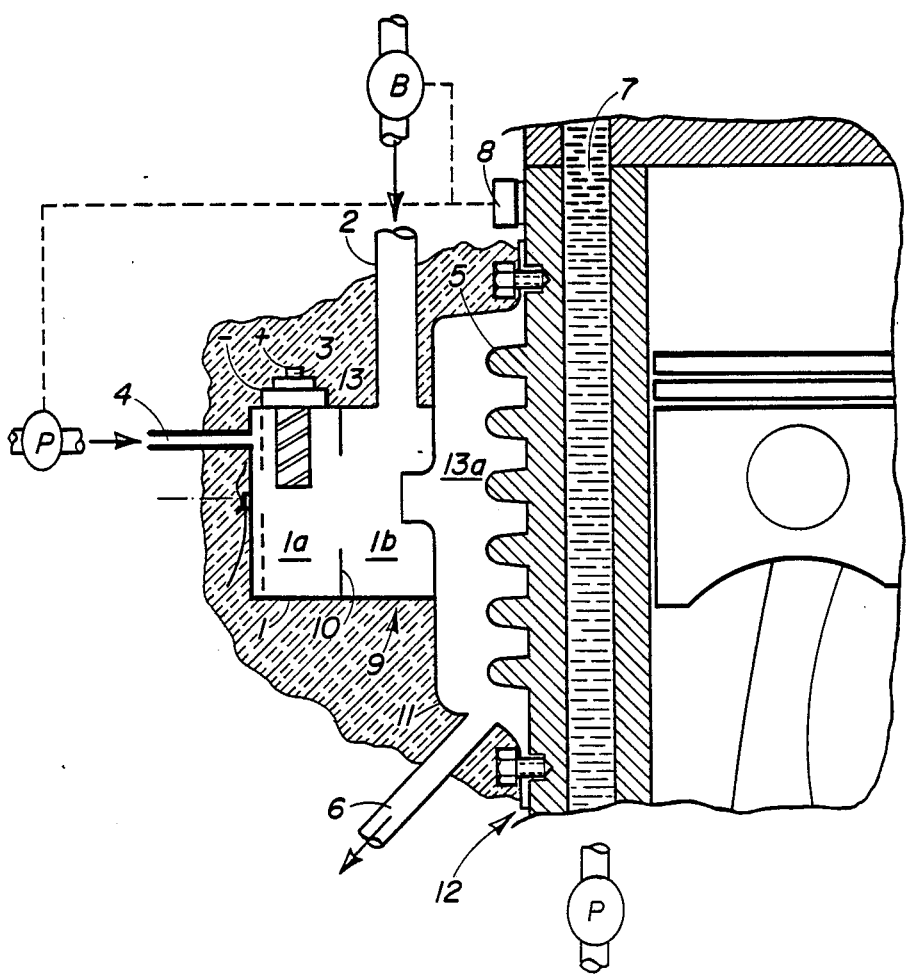
FIG. 1 is schematic sectional view of a internal combustion engine having a heater associated therewith, constructed in accordance with a first embodiment of the invention and, FIG. 2 is a schematic sectional view similar to FIG. 1 showing a second embodiment of the invention.
Figure 2:
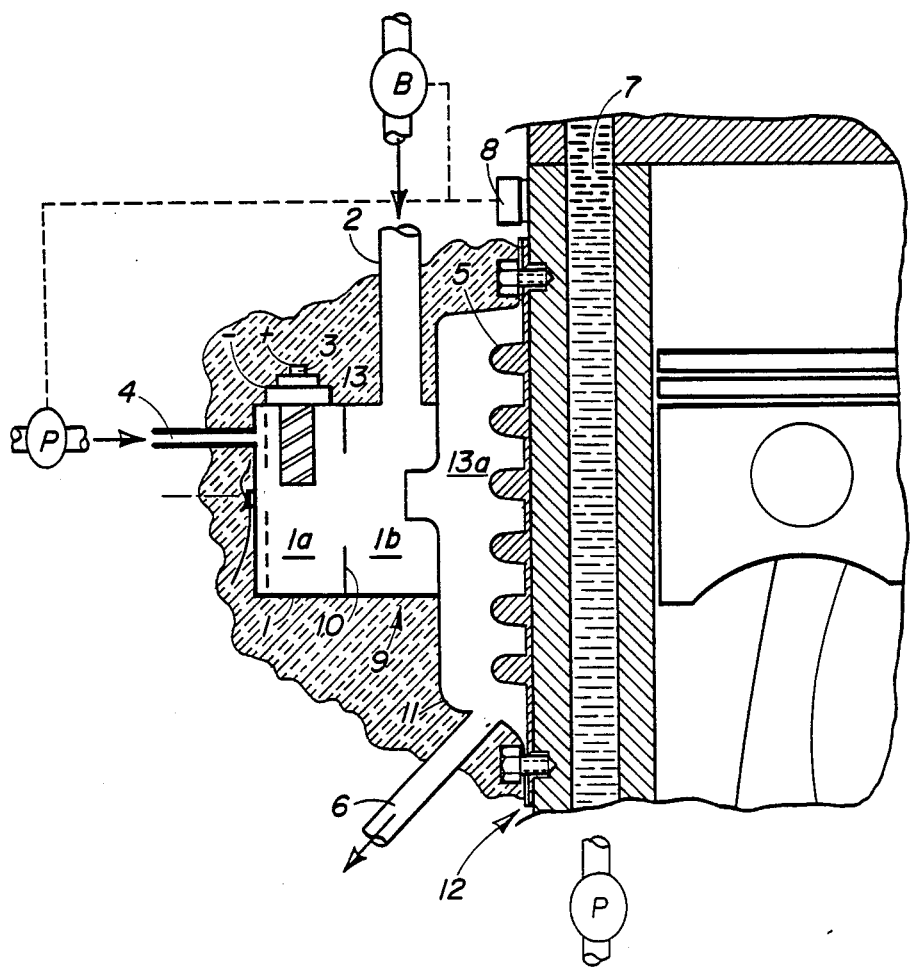

Referring to the drawings, in particular, the invention embodied therein comprises a cooling fluid heater for internal combustion engines which have a jacket 12 of double wall construction through which a cooling fluid or cooling water is circulated. In accordance with the invention, a liquid fuel heater is provided which operates from its own source of fuel. This fuel is pumped by a pump P through a fuel line 4. The fuel combines with combustion air pumped by a blower B through an air inlet line 2 and forms gaseous products of combustion upon ignition. The combustion gases are directed through a transition piece 11 which encompasses a portion of the engine jacket to apply heat directly to a finned wall 5 thereof which, in turn, heats the water 7 which is circulated through the jacket.

The represented heating apparatus 9 has an essentially cylinder-shaped combustion chamber 1, which is subdivided by an annular disk 10 with medium flow opening into the first zone 1a and a second zone 1b on respective sides of the plate. In the first zone, an ignition plug 3 is arranged, and in the first zone the duct or fuel line 4 for liquid fuel. Fine distribution of the fuel is connected in the first zone can take place by known suitable means, for 10 example, an ultrasonic generator. Into the second zone flows tangentially a duct 2 for combustion air to be blown in. A fuel pump P and a combustion air blower B can be provided, either directly on the heating apparatus 9 or can be installed at a distance from it and connected with flexible connections with ducts 4 and 2.

The end of the combustion chamber 1, in the drawing on the right-hand side, is adjoined by a bowl-shaped cross-sectionally round transition piece 11 formed of sheet metal. Transition piece 11 acts as a diffusion means for directing combustion gases to the firmed walls 5 of the engine jacket. A central inflow opening 13 into a heating chamber 13a of a transition piece 11 is smaller in diameter than the combustion chamber 1. At the flange-like margin, which has a larger diameter, the transition piece 11 is screwed on its right outside to the outer wall of a cylinder block 12. The hot combustion gases streaming through the inflow opening 13 into the transition piece 11 flood the area 13a of the cylinder block 12, which is significantly larger than the cross section of the combustion chamber 1. The cooled down combustion gases flow through one or more exhaust stacks 6, which are directed essentially radially and away from the cylinder block 12, out of the transition piece 11.

The area of the outer wall of the cylinder block 12 which is flooded by the combustion gases is provided with ribbing 5 on the outside. These ribs 5 can be some that for reasons of reinforcement are on the cylinder block 12 anyhow.

At the larger front face of the transition piece 11, a metal cooling plate can optionally be provided, which, in turn, is fastened with its surface to a, in particular, planar area of the outer wall of the cylinder block 12. This cooling plate can be ribbed on the side facing the combustion chamber 1.

The reference number 7 designates a cooling fluid chamber in the cylinder block 12, which at least in that location is doublewalled.

A temperature sensor 8 is fastened on the cylinder block 12. If the temperature sensor 8 detects that a given limit temperature has been exceeded, and causes the heating apparatus 9 to be switched off. The control of the arrangement can also be designed so that if a given limit temperature has fallen below and the temperature sensor 8 detects this, the heating apparatus 9 can be switched on again.

In order to keep heat losses to the environment at a minimum, the combustion chamber 1 and the transition piece 11 can be thermally insulated on their outside through the application of a sufficiently heat-stable porous synthetic material 14.

The larger right front face of the transition piece 11 can be, for example, approximately 30 to 90% as high as the cylinder block 12 and measured in the longitudinal direction of the engine—have a length, which corresponds exactly to a range of one cylinder diameter to several cylinder diameters. This front face does not need to be essentially circular but can also be, for example, rounded-off rectangular. The front face edge of the transition piece 11 is adapted to the shape of the engine block 12.

While a specific embodiment of the invention has been shown and described in detail to illustrate the application of the principles of the invention, it will be understood that the invention may be embodied otherwise without departing from such principles.

What is claimed is:

1. A cooling fluid heater in a vehicle supplying heat to said vehicle, the vehicle having an internal combustion engine with a cylinder and a cooling fluid chamber in contact with the cylinder, the cooling fluid chamber having an exterior surface, comprising: a heater housing defining a combustion chamber; means for directing fuel and air into said combustion chamber; combustion gas diffusing means having a combustion gas intake connected to said combustion chamber; a heat transfer portion formed with the exterior surface of the cooling fluid chamber, said combustion gas diffusing means for directing combustion gases from said combustion chamber to said cooling fluid chamber exterior surface for heating the cooling fluid in said cooling fluid chamber; and, a cooling water circulation pump connected to said cooling fluid chamber for circulating water.

2. A cooling fluid-heater according to claim 1, wherein said combustion gas diffusing means comprises an enlarged casing extending outwardly from said combustion chamber having a transfer front face connected to the exterior of the cooling fluid chamber.

3. A cooling fluid heater according to claim 1, wherein: a diffusion means is substantially bowl-shaped so as to distribute the combustion gases more broadly.

4. A cooling fluid heater according to claim 3, wherein the heat transfer portion includes fins connected to the exterior of the cooling fluid chamber.

5. A cooling fluid heater according to claim 1, wherein: the diffusion means includes a sheet metal wall formed to the configuration of the exterior of the cooling fluid chamber and connection means for bolting the sheet metal wall to the exterior of the cooling fluid chamber.

6. A cooling fluid heater according to claim 1, further comprising means for thermally insulating the exterior of said combustion chamber and said diffusing means.

7. A cooling fluid heater according to claim 1, further comprising a temperature sensor connected to said cooling fluid chamber, said temperature sensor being responsive to the temperature of the fluid circulated through the cooling fluid chamber, said temperature sensor being connected to the combustion chamber for regulating combustion in accordance with a sensed temperature.

8. A cooling fluid heater according to claim 1, wherein said combustion chamber includes an annular disc portion positioned within said chamber separating said chamber into an air inlet side and a discharge side connected to said diffusing means, a spark plug being positioned in said inlet side, means for directing fuel into said combustion chamber being connected to said inlet side and means for directing air being connected to said discharge side.

9. A cooling fluid heater in a vehicle supplying heat to said vehicle, the vehicle having an internal combustion engine with a cylinder and a cooling fluid chamber in contact with the cylinder, the cooling fluid chamber having an exterior surface, comprising: a heater housing defining a combustion chamber; means for directing fuel and air into said combustion chamber; combustion gas diffusing means having a combustion gas intake connected to said combustion chamber; a heat transfer portion connected to the exterior surface of the cooling fluid chamber, said combustion gas diffusing means for directing combustion gases from said combustion chamber to said heat transfer portion for heating the cooling fluid in said cooling fluid chamber; and, a cooling water circulation pump connected to said cooling fluid chamber for circulating cooling fluid.

10. A cooling fluid heater in combination with an internal combustion engines which has an engine jacket with a wall through which a cooling fluid is circulated, comprising a liquid fuel heater having a heater housing defining a combustion chamber, a combustion chamber transition piece portion connected to said combustion chamber and having an engine jacket encompassing part engageable over a portion of the engine jacket, means for directing a fuel and air mixture into said combustion chamber and igniting the mixture to generate gaseous products of combustion which are directed into the transition piece portion so as to heat the combustion engine jacket and thereby the fluid therein, said transition piece part being substantially bowl-shaped so as to distribute the combustion gases more broadly.

11. A cooling fluid heater in combination with an internal combustion engines which has an engine jacket with a wall through which a cooling fluid is circulated, comprising a liquid fuel heater having a heater housing defining a combustion chamber, a combustion chamber transition piece portion connected to said combustion chamber and having an engine jacket encompassing part engageable over a portion of the engine jacket, means for igniting an air fuel mixture to generate gaseous products of combustion which are directed into the transition piece portion so as to heat the combustion engine jacket and thereby the fluid therein, said combustion chamber including an annular disk portion separating said chamber into an inlet side and a discharge side connected to said transition piece and including a spark plug in said inlet side, said means for directing liquid fuel into said combustion chamber being connected to said inlet side and means for directing combustion air is directed through the transition piece side.

* * * * *